(12) United States Patent
Hosking

(10) Patent No.: US 8,687,966 B2
(45) Date of Patent: Apr. 1, 2014

(54) FIBER OPTIC TRANSCEIVER MODULE WITH OPTICAL DIAGNOSTIC DATA OUTPUT

(75) Inventor: Lucy G. Hosking, Santa Cruz, CA (US)

(73) Assignee: Finisar Corporation, Sunnyvale, CA (US)

( * ) Notice: Subject to any disclaimer, the term of this patent is extended or adjusted under 35 U.S.C. 154(b) by 823 days.

(21) Appl. No.: 12/200,406

(22) Filed: Aug. 28, 2008

(65) Prior Publication Data

US 2010/0054734 A1 Mar. 4, 2010

(51) Int. Cl.
*H04B 10/06* (2011.01)
*H04B 10/00* (2013.01)
*H04B 10/24* (2011.01)

(52) U.S. Cl.
USPC ...... 398/135; 398/1; 398/9; 398/25; 398/208; 398/164

(58) Field of Classification Search
USPC .......................................... 398/135
See application file for complete search history.

(56) References Cited

U.S. PATENT DOCUMENTS

| | | | |
|---|---|---|---|
| 5,812,572 A | 9/1998 | King et al. | |
| 6,141,125 A | 10/2000 | Blair et al. | |
| 6,692,132 B1 | 2/2004 | Meeker | |
| 6,975,395 B1 | 12/2005 | Gentieu et al. | |
| 7,072,587 B2 | 7/2006 | Dietz et al. | |
| 7,215,891 B1 * | 5/2007 | Chiang et al. | 398/137 |
| 7,268,688 B2 | 9/2007 | Juds | |
| 7,286,736 B2 | 10/2007 | Rosenberg | |
| 7,320,551 B1 | 1/2008 | Moore et al. | |
| 7,426,348 B2 | 9/2008 | Mahowald et al. | |
| 7,507,111 B2 | 3/2009 | Togami et al. | |
| 7,630,631 B2 | 12/2009 | Aronson et al. | |
| 7,721,012 B2 | 5/2010 | Le et al. | |
| 7,757,936 B2 | 7/2010 | Aguren et al. | |
| 2002/0149821 A1 | 10/2002 | Aronson et al. | |
| 2003/0020986 A1 | 1/2003 | Pang et al. | |
| 2003/0053170 A1 | 3/2003 | Levinson et al. | |
| 2003/0057984 A1 * | 3/2003 | Akram | 324/755 |
| 2003/0163508 A1 | 8/2003 | Goodman | |
| 2003/0231839 A1 | 12/2003 | Chen et al. | |
| 2004/0071471 A1 | 4/2004 | Baker et al. | |
| 2004/0213286 A1 | 10/2004 | Jette et al. | |
| 2005/0032415 A1 | 2/2005 | Sakamoto | |
| 2005/0079831 A1 | 4/2005 | Ramachandran | |
| 2005/0105915 A1 * | 5/2005 | Light | 398/164 |
| 2005/0196111 A1 | 9/2005 | Burdick et al. | |
| 2005/0196322 A1 * | 9/2005 | Truex et al. | 422/82.01 |
| 2005/0238305 A1 | 10/2005 | Miller et al. | |
| 2006/0062116 A1 | 3/2006 | Ishibashi | |
| 2006/0093379 A1 * | 5/2006 | Aronson | 398/208 |

(Continued)

OTHER PUBLICATIONS

U.S. Appl. No. 12/184,042, May 3, 2011, Office Action.

(Continued)

*Primary Examiner* — Oommen Jacob
(74) *Attorney, Agent, or Firm* — Maschoff Brennan

(57) ABSTRACT

Exemplary embodiments of the invention relates to an optical transceiver module having a diagnostic assembly, wherein the diagnostic assembly is configured to visually display the operational status of the transceiver transmitter and receiver components while optically transmitting diagnostic information. The transceiver operational status is accessible while the transceiver operates in conjunction with an external host and may be ascertained in real time without interrupting normal transceiver operation or suspending the transmission of data over optical fibers.

24 Claims, 11 Drawing Sheets

(56) References Cited

U.S. PATENT DOCUMENTS

| | | | |
|---|---|---|---|
| 2006/0189220 A1* | 8/2006 | Duval et al. | 439/760 |
| 2006/0237636 A1* | 10/2006 | Lyons et al. | 250/228 |
| 2007/0058980 A1 | 3/2007 | Hidaka | |
| 2007/0058987 A1* | 3/2007 | Suzuki | 398/183 |
| 2007/0092257 A1 | 4/2007 | Smith et al. | |
| 2007/0147843 A1* | 6/2007 | Fujiwara | 398/118 |
| 2007/0291491 A1 | 12/2007 | Li et al. | |
| 2009/0261955 A1 | 10/2009 | Moore et al. | |
| 2010/0027991 A1 | 2/2010 | Hosking | |
| 2010/0028014 A1 | 2/2010 | Hosking | |
| 2010/0028015 A1 | 2/2010 | Hosking | |
| 2010/0054733 A1 | 3/2010 | Hosking | |
| 2010/0054749 A1 | 3/2010 | Hosking | |

OTHER PUBLICATIONS

U.S. Appl. No. 12/184,042, Aug. 22, 2011, Office Action.
U.S. Appl. No. 12/184,042, Jan. 19, 2012, Notice of Allowance.
U.S. Appl. No. 12/184,093, Apr. 19, 2011, Office Action.
U.S. Appl. No. 12/184,093, Sep. 13, 2011, Office Action.
U.S. Appl. No. 12/184,093, Nov. 3, 2011, Notice of Allowance.
U.S. Appl. No. 12/184,101, May 3, 2011, Office Action.
U.S. Appl. No. 12/184,101, Mar. 14, 2012, Office Action.
U.S. Appl. No. 12/184,101, Apr. 16, 2012, Notice of Allowance.
U.S. Appl. No. 12/200,337, Aug. 5, 2011, Office Action.
U.S. Appl. No. 12/200,337, Mar. 15, 2012, Office Action.
U.S. Appl. No. 12/200,398, May 26, 2011, Office Action.
U.S. Appl. No. 12/200,398, Feb. 1, 2012, Office Action.

* cited by examiner

FIBER OPTIC TRANSCEIVER MODULE WITH OPTICAL DIAGNOSTIC DATA OUTPUT

BACKGROUND OF THE INVENTION

1. The Field of the Invention

The present invention relates generally to optoelectronic communication devices. More specifically, the present invention relates to an optical transceiver module having a diagnostic assembly which visually indicates operational status while optically outputting diagnostic data.

2. The Relevant Technology

Computing and networking technology have transformed our world. As the amount of information communicated over networks has increased, high-speed transmission has become ever more critical. Many high-speed data transmission networks rely on optical transceivers and similar devices for facilitating transmission and reception of digital data embodied in the form of optical signals over optical fibers. Optical networks are thus found in a wide variety of high-speed applications ranging from as modest as a small Local Area Network (LAN) to as grandiose as the backbone of the Internet.

Typically, data transmission in such networks is implemented by way of an optical transmitter (also referred to as an electro-optic transducer), such as a laser or Light Emitting Diode (LED). The electro-optic transducer emits light when current is passed there through, the intensity of the emitted light being a function of the current magnitude through the transducer. Data reception is generally implemented by way of an optical receiver (also referred to as an optoelectronic transducer), an example of which is a photodiode. The optoelectronic transducer receives light and generates a current, the magnitude of the generated current being a function of the intensity of the received light.

Various other components are also employed by the optical transceiver to aid in the control of the optical transmit and receive components, as well as the processing of various data and other signals. For example, such optical transceivers typically include an electro-optic transducer driver (e.g., referred to as a "laser driver" when used to drive a laser signal) configured to control the operation of the optical transmitter in response to various control inputs. The optical transceiver also generally includes an amplifier (e.g., often referred to as a "post-amplifier") configured to perform various operations with respect to certain parameters of a data signal received by the optical receiver. A controller circuit (hereinafter referred to the "controller"), which is the focus here, controls the operation of the laser driver and post amplifier.

In addition to controlling the operation of the laser driver and the post amplifier, the controller may collect and manage diagnostic data. Performance characteristics of an optical transmitter and receiver may vary in response to changes in operational conditions like temperature and voltage. For example, the threshold current and slope efficiency of a laser diode vary with temperature. To ensure the quality and integrity of data transmission, various measurement and compensation circuits may be employed by a transceiver to compensate for these changes. The transceiver controller may evaluate operating conditions, such as, but not limited to, temperature, voltage, and low frequency changes (such as receive power) from the post-amplifier and/or from the laser driver, and then adjust component settings to compensate for any changes. The operating condition parameter values, referred to collectively as "diagnostic data", may also be evaluated by the host computer system which typically has access to the controller via a serial interface.

In addition to, and sometimes in conjunction with managing diagnostic data, a controller may also drive several other transceiver functions, including, but not limited to, the following: (i) setup functions which generally relate to the required adjustments made on a part-to-part basis in the factory to allow for variations in component characteristics such as laser diode threshold current; (ii) identification information identifying the transceiver type, capability, serial number, and compatibility with various standards; (iii) eye safety and general fault detection which are used to identify abnormal and potentially unsafe operating parameters and to report these to the user and/or perform laser shutdown, as appropriate; (iv) temperature compensation functions which compensate for known temperature variations in key laser characteristics such as slope efficiency; and (v) monitoring functions that report various parameter values related to the transceiver operating characteristics and environment such as laser bias current, laser output power, received power level, supply voltage and temperature. As such, controller functions and the data contained therein are integral to network performance and, consequently, would be useful to end users such as network administrators if only the data was easily accessible.

Unfortunately, conventional host equipment often lack the ability to access the data. Other host equipment, which may be capable of accessing diagnostic data, typically lacks the means to convey the diagnostic data to an end user in an easy manner. The information can only be obtained through effort that includes additional equipment. It is therefore difficult for network administrators to determine the status of an individual link and to troubleshoot complex systems.

BRIEF SUMMARY OF THE INVENTION

These and other limitations are overcome by embodiments of the invention which relate to an optical transceiver module in which the transmission status of the module is visually indicated on the face of the transceiver in real time. This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Exemplary embodiments of the invention relates to an optical transceiver module having a diagnostic assembly, wherein the diagnostic assembly is configured to visually display the operational status of the transceiver transmitter and receiver components and/or optically transmit diagnostic information. The transceiver operational status is accessible while the transceiver operates in conjunction with an external host and may be ascertained in real time without interrupting normal transceiver operation or suspending the transmission of data over optical fibers.

In evaluating operation conditions, the transceiver's controller receives analog measurements from several sensors, converts the analog signal to a digital value, performs comparison logic with the digital values and predetermined setup data, and, finally, stores the digital operating condition values and the results of the comparison logic (collectively "digital diagnostic data") in the controller's non-volatile memory. Embodiments of the present invention visually indicate the operational status of the transceiver with LED driven status indicators which are simultaneously modulating so as to optically transmit the diagnostic data to an external device. The external device provides a means to display the diagnostic data and may be any communicable device such as a laptop, PDA, PC or a dedicated device.

The transceiver's controller module detects the operational status of the transmitter component and/or receiver component, and drives the color of a multi-colored light-emitting diode (LED) based on the value detected. The LED may be mounted anywhere on the printed circuit board of the transceiver and changes colors as the value of the parameter represented changes. The light emitted from the LED is conducted to an opening on the face of the transceiver by a light conductance means such as a light-pipe assembly, thereby allowing an end user to visually ascertain the operational status of the parameters represented.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE SELECTED EMBODIMENTS

Reference will now be made to the drawings to describe various aspects of exemplary embodiments of the invention. It should be understood that the drawings are diagrammatic and schematic representations of such exemplary embodiments and, accordingly, are not limiting of the scope of the present invention, nor are the drawings necessarily drawn to scale.

As mentioned above, in addition to controlling the operation of the laser driver and the post amplifier, the controller collects and manages diagnostic data and other performance data. Further, a controller may also drive several transceiver functions, including setup functions, eye safety and general fault detection, temperature compensation functions, monitoring functions, etc. As such, transceiver controller functions and data are integrally associated with and have significant affects on with many aspects of network administration.

Embodiments of the invention provide access to the diagnostic data and other aspects of transceiver functionality. By making this type of access readily available, diagnostic data generated within a transceiver while it is operating within a host system can provide valuable insight into several network administration concerns including transceiver's performance, the integrity of the optical link, the behavior of the optical signal, and the like.

Typically, the host equipment (such as a host computer system) is the only available interface between a transceiver module and an end user during operation. Therefore, when a transceiver generates diagnostic data, end user access to that data depends solely on whether the particular host system in which it operates has the ability to access, process, and then display the data in a meaningful way. And conventional host equipment often lacks the ability to even gain access to the data. It is therefore difficult for network administrators to determine the status of an individual link and to troubleshoot complex systems. The present invention enables an end user to bypass the difficulties and impediments associated with gaining access to the diagnostic data via the host equipment by creating a direct link to the data via the diagnostic assembly.

System Overview

Figure 1:
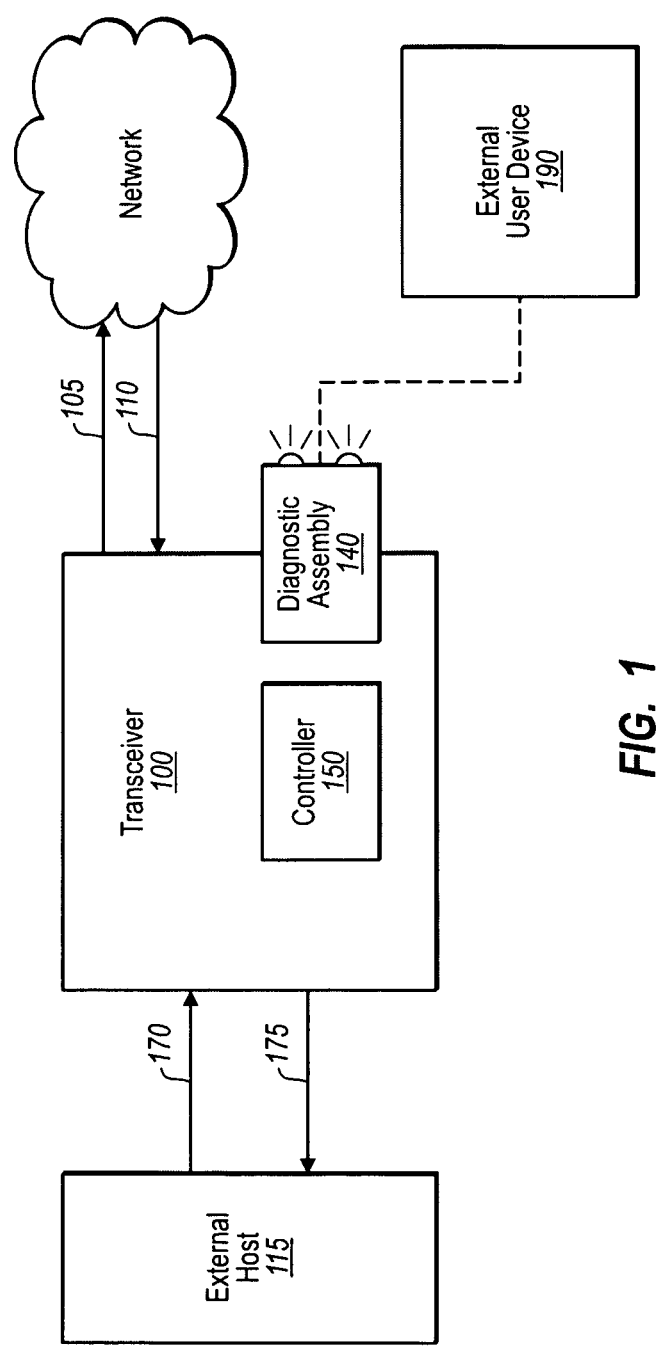
FIG. 1 illustrates a system overview example of an optical transceiver environment that may implement features of the present invention.

Referring to the system overview illustrated in FIG. 1, exemplary embodiments of the invention relate to an optical transceiver module 100 having a diagnostic assembly 140, wherein the diagnostic assembly 140 is configured to visually display information related to the transceiver operation while optically outputting transceiver diagnostic data. The diagnostic assembly 140 functions while transceiver 100 operates in conjunction with an external host 115, as represented by arrows 170 and 175, and the transceiver status may be perceived in real time without interrupting normal transceiver operation or suspending the transmission of high-speed data over optical fibers 105 and 110. The diagnostic data is accessed with an external user device 190 via the diagnostic assembly 140 which is accessed through the face of the transceiver module 100.

External user devices that may be employed in conjunction with the invention include PCs, cellular telephones, PDAs, laptop computers and any other device having a presentation mechanism or an associated presentation mechanism and is suitably equipped to establish communication with the diagnostic assembly 140 of the transceiver module 100. In particular, exemplary embodiments of the invention are directed to the use of a laptop computer as an external user device. However, exemplary embodiments of the invention should not be construed to be limited to the use of laptop computers.

Figure 2:
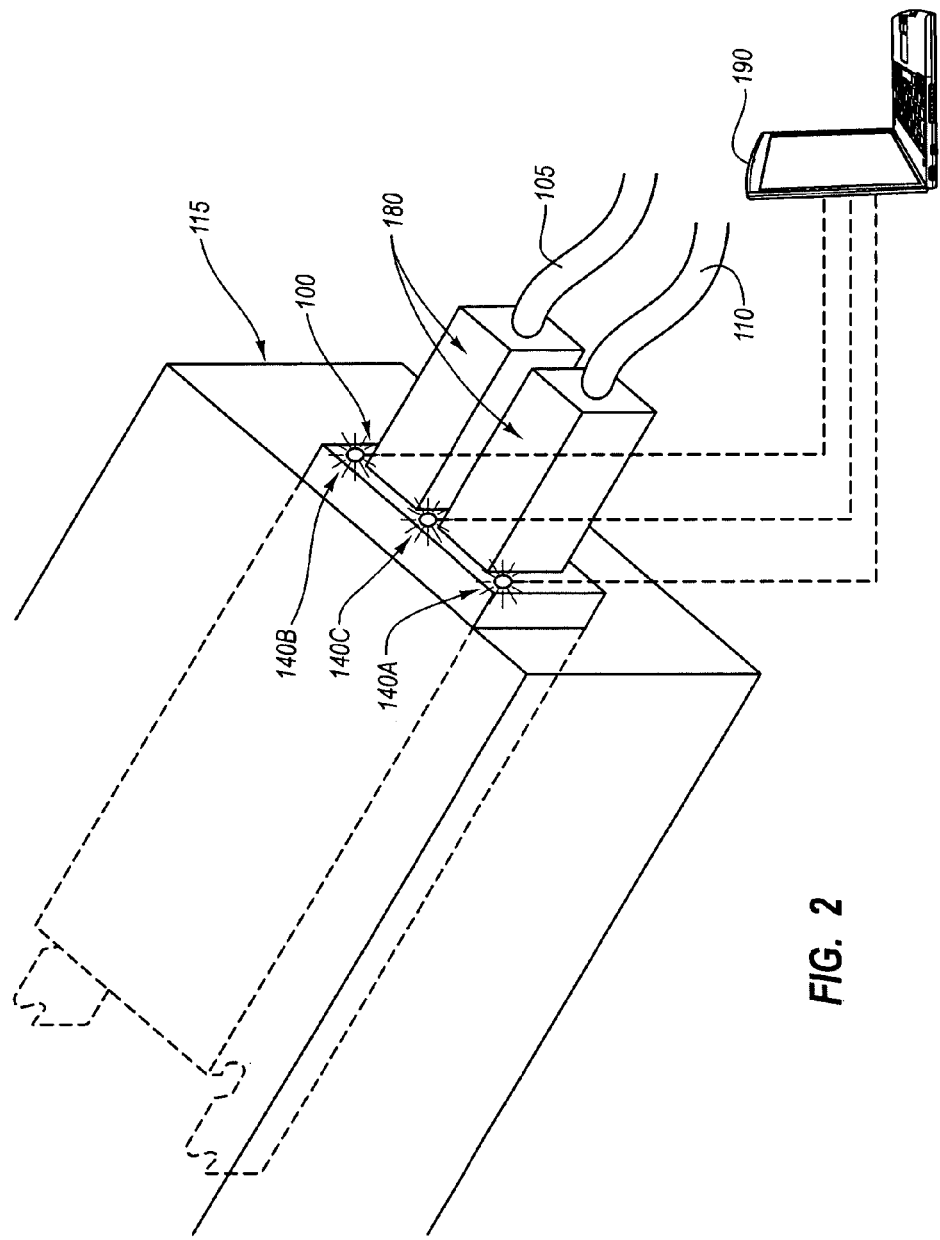
FIG. 2 illustrates an exemplary embodiment of the system diagram of FIG. 1 for communicating with an external device.

FIG. 2 illustrates an exemplary embodiment of the system diagram of FIG. 1. The transceiver 100 is engaged with the external host 115 such that it may transfer optical high-speed data over fibers 105 and 110. The diagnostic assembly 140 is visually ascertainable while the fiber connectors 180 are plugged into the transceiver 100 and may be implemented as a plurality of multi-color Light-Emitting Diodes (LED) indicators and light pipe assemblies as described further herein. In the example shown in FIG. 2, the diagnostic assembly is comprised of three LED indicators 140A, 140B, and 140C each representing a different operational parameter. For instance, the configuration shown may be configured to represent TxDisable, TxFault, and RxLOS. The particular operational parameter configuration represented herein by the diagnostic assembly are by way of example only, and not meant to restrict the scope of the invention. Virtually any conceivable parameter combination may be represented by the diagnostic assembly. In addition to representing particular operational parameters, the LED indicators also emit an optical signal representative of diagnostic data of the transceiver. The emitted optical signal is transmitted to the external device 190 for use by an end user.

LED Configuration

Figure 3A:
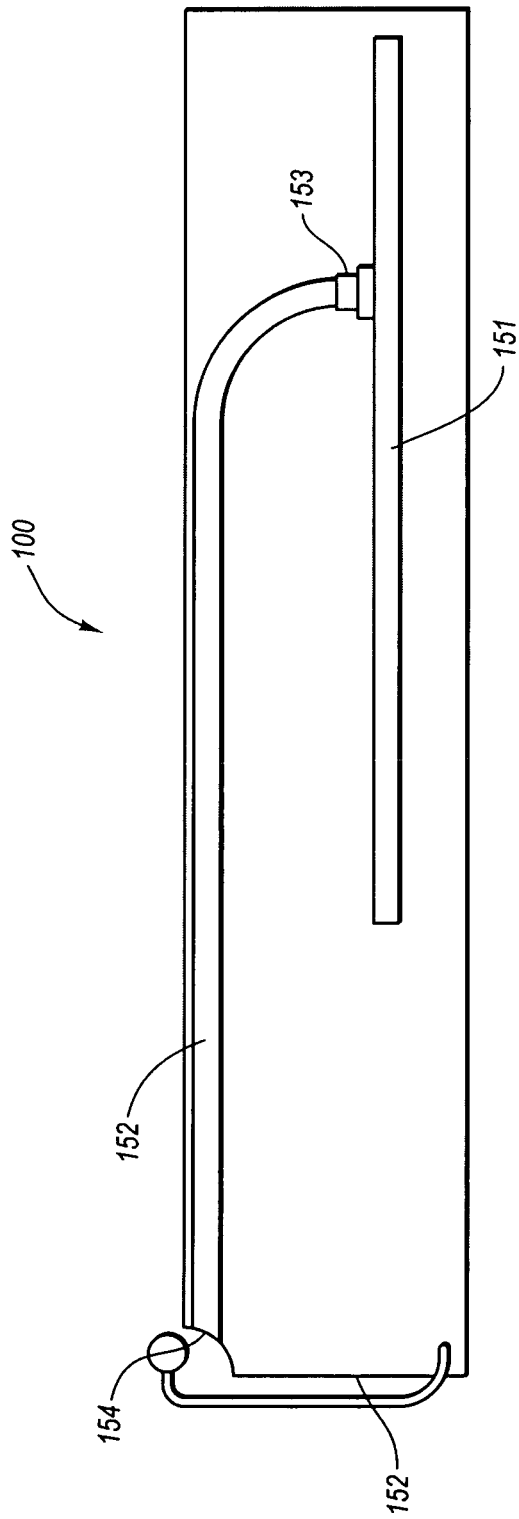
FIG. 3A illustrates a side view of an exemplary embodiment of an optical transceiver having a light pipe assembly that may implement features of the present invention.

As shown in FIG. 3A, the LED indicator 153 is located on the printed circuit board 151. The optical output from the LED indicator 153 is carried to face 156 of the transceiver 100 via a light pipe assembly 152. The light pipe assembly 152 extends from the LED indicator 153 to an opening 154 on the face 156 of the transceiver 100 such that the light is visible and the optical signal may be accessed by components external to the transceiver, namely the external user device.

Figure 3B:
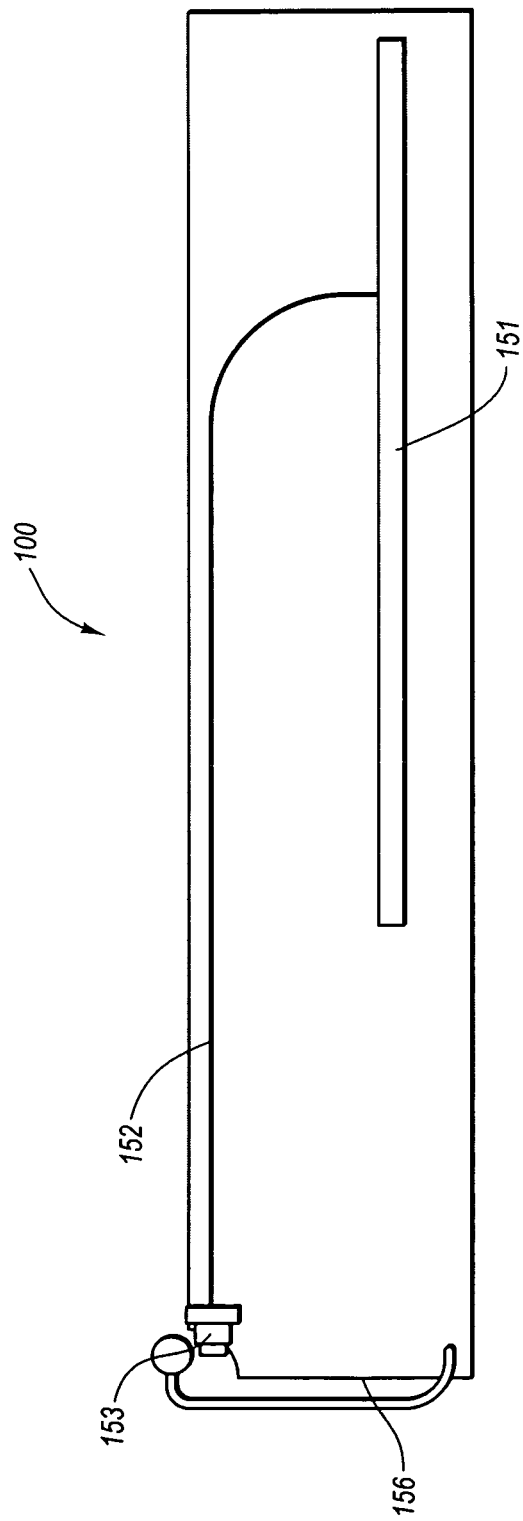
FIG. 3B illustrates a side view of an exemplary embodiment of an optical transceiver having an integrated LED that may implement features of the present invention.

Alternatively, the optical components of the diagnostic assembly may be integrated directly into the face of the transceiver as shown in FIG. 3B. In this embodiment, the LED 153 is located directly in the face 156 of the transceiver 100 and communicates with the controller 150 via an electrical connection 157 to the printed circuit board 157.

While the particular embodiments of FIGS. 3A and 3B employ a light pipe assembly to the conduct light from the LED to the face of the transceiver, the light from the LED may be conducted by means of fibers, molded plastic light pipes, or any reflective, refractive, or conductive channel. Using a light conduction means as opposed to mounting LEDs directly on the visible surface of the transceiver allow the LED to be mounted anywhere on the printed circuit board of the transceiver, thereby the eliminating tricky mounting and wiring issues that would be encountered in directly mounting the LEDs on the limited surface area available. Additionally, by conducting light from the printed circuit board, the viewing position and viewing angle of the indicator is more easily achieved.

Several color combinations may be used to indicate different operational states of the transceiver. Bicolor LEDs contain 2 die of different colors connected back to back, and can produce any of 3 colors. Current flow in one direction produces one color, current in the other direction produces the other color, and bidirectional current produces both colors mixed together. Tricolor LEDs contain 2 die of different colors with a 3 wire connection, available in common anode or common cathode configurations. The most common form of both the bicolor and tricolor LEDs is red/green, producing orange when both colors are powered. RGB LEDs contain red, green and blue emitters, generally using a 4 wire connection with one common (anode or cathode).

Figure 4A:
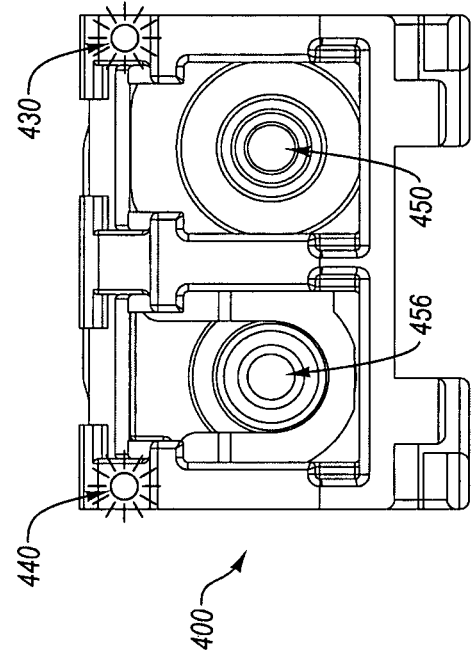
FIG. 4A illustrates the front view of an example embodiment of an optical transceiver having three LED indicators that may implement features of the present invention.
Figure 4B:
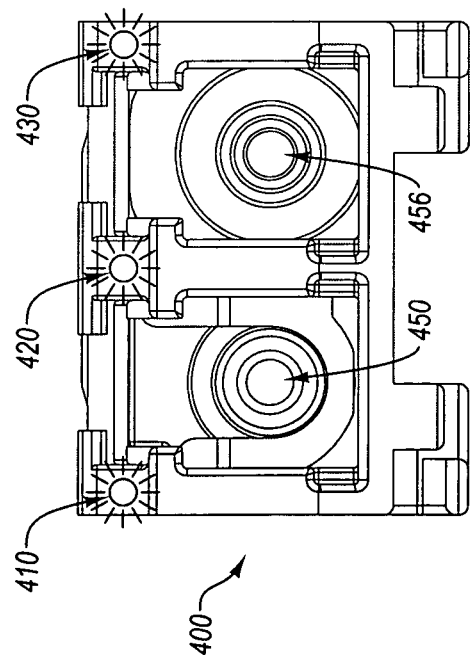
FIG. 4B illustrates the front view of an example of an alternative embodiment of an optical transceiver having two LED indicators that may implement features of the present invention.

As shown in FIGS. 4A and 4B, the number of indicators on the face of the transceiver 400 may vary. Each indicator may represent a operational parameter value associated with the transceiver. For example, in the three indicator configuration of FIG. 4A, the indicators may represent the TxDisable indicator 410, TxFault indicator 420, and RxLOS indicator 430. Each indicator is each illuminated by a multi-color LED, and may represent different operational states according to Table 1.

TABLE 1

| SIGNAL | INDICATOR COLOR | INDICATION |
|---|---|---|
| TxDisable | Green | Transmitter is enabled by host. |
| | Yellow or Red | Transmitter is disabled by host. |
| TxFault | Green | No transmitter error detected. |
| | Yellow | Transmitter warning condition detected. Outbound optical signal quality may be degraded. |
| | Red | Fault detected. Transmitter is not operational. |
| RxLOS | Green | Received optical signal strength is good. |
| | Yellow | Received optical signal strength is marginal. |
| | Red | No incoming optical signal. |

In the two indicator configuration of FIG. 4B, the indicators may be TxDisable/TxFault indicator 440, and a RxLOS indicator 430, and may represent operational states according to Table 2. Notably, in both configurations, the status indicators are visually ascertainable when fiber connector cables are plugged into the transceiver receptacles 450.

TABLE 2

| SIGNAL | INDICATOR COLOR | INDICATION |
|---|---|---|
| TxDisable/ TxFault | Green | Transmitter is enabled and no transmitter error detected. The outbound optical link is operational. |
| | Yellow | Transmitter is disabled by host. |
| | Red | Transmitter fault detected. The outbound optical link is not operational. |
| RxLOS | Green | Received optical signal strength is good. |
| | Yellow | Received optical signal strength is marginal. |
| | Red | No incoming optical signal. |

Transceiver Operation

An example operational optical transceiver environment will first be described. Then, the operation in accordance with the invention will be described with respect to the operational environment.

While the optical transceiver 100 will be described in some detail, the optical transceiver 100 is described by way of illustration only, and not by way of restricting the scope of the invention. The principles of the present invention are suitable for 1 G, 2 G, 4 G, 8 G, 10 G and higher bandwidth fiber optic links. Furthermore, the principles of the present invention may be implemented in optical (e.g., laser) transmitter/receivers of any form factor such as XFP, SFP and SFF, without restriction. Having said this, the principles of the present invention are not limited to an optical transceiver environment at all.

Figure 5:
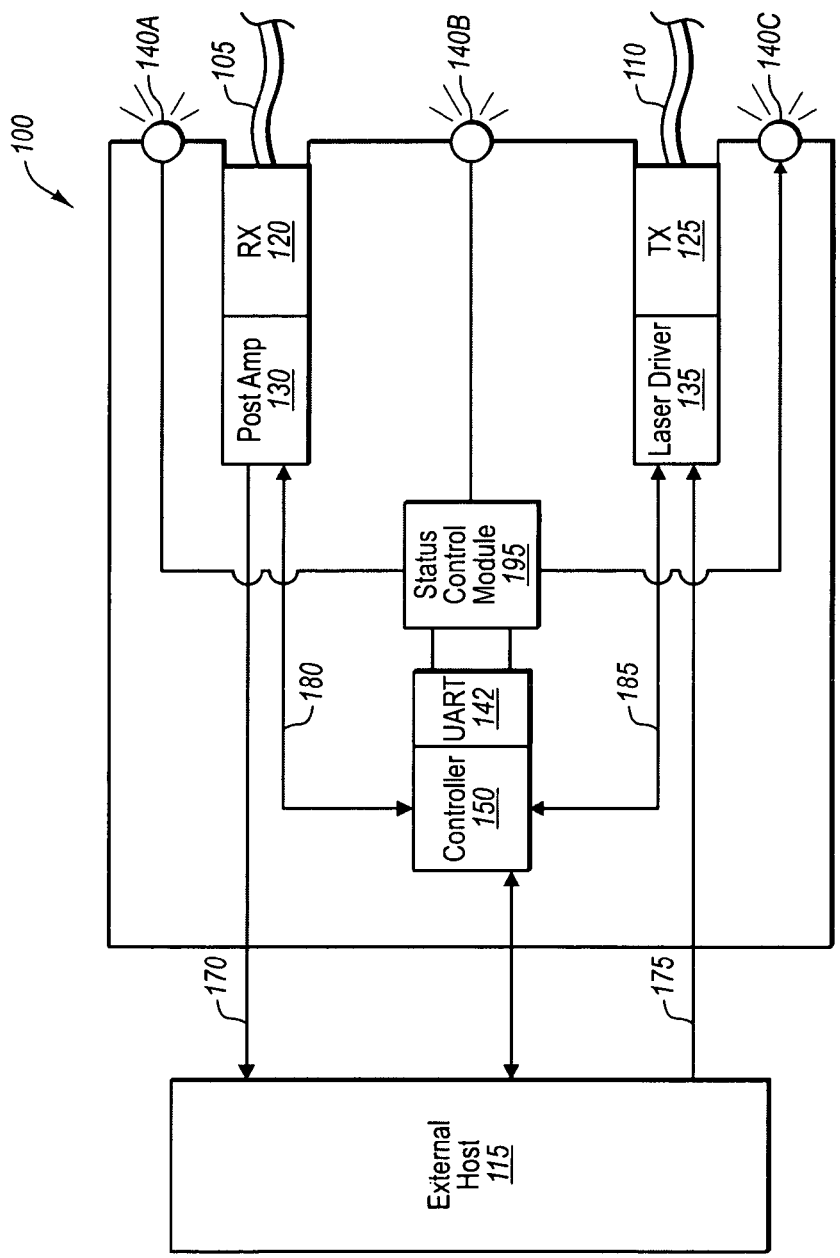
FIG. 5 is a block diagram that illustrates the transceiver module of FIG. 1 in further detail.

As shown in FIG. 5, the optical transceiver 100 receives an optical signal from fiber 105 using receiver 120. The receiver 120 acts as an opto-electric transducer by transforming the optical signal into an electrical signal. The receiver 120 provides the resulting electrical signal to a post-amplifier 130. The post-amplifier 130 amplifies the signal and provides the amplified signal to an external host computing system represented by arrow 170. The external host 115 may be any computing system capable of communicating with the optical transceiver 100.

The optical transceiver 100 may also receive electrical signals from the host 115 for transmission onto the fiber 110. Specifically, the laser driver 135 receives an electrical signal from host 115 as represented by the arrow 175, and drives the transmitter 125 (e.g., a laser or LED) to emit optical signals onto the fiber 110, where optical signals are representative of the information in the electrical signal provided by the host 115. Accordingly, the transmitter 125 serves as an electro-optic transducer.

The behavior of the receiver 120, the post-amplifier 130, the laser driver 135, and the transmitter 125 may vary dynamically due to a number of factors. For example, temperature changes, power fluctuations, and feedback conditions may each affect the performance of these components. To ensure the quality and integrity of data transmission, various measurement and compensation circuits may be employed to compensate for these changes. The measurement and compensation circuits are managed by the controller 150 of the transceiver.

The controller 150 collects and evaluates diagnostic data, such as, but not limited to, temperature, voltage, and low frequency changes (such as receive power) from the post-amplifier 130 (as represented by arrow 180) and/or from the laser driver 135 (as represented by arrow 185). In evaluating operation conditions, the controller 150 receives analog measurements from several sensors, converts the analog signal to a digital value, performs comparison logic with the digital values and predetermined setup data, and, finally, stores the digital operating condition values and the results of the comparison logic (collectively "digital diagnostic data") in the controller's 150 non-volatile memory. This allows the controller 150 to optimize the dynamically varying performance, and additionally detect when there is a loss of signal. Specifically, the controller 150 may counteract these changes by adjusting settings on the post-amplifier 130 and/or the laser driver 135 as also represented by the arrows 180 and 185.

The manner in which the controller manages the transceiver operation is governed by the controller's firmware. The controller's firmware is located in non-volatile memory and typically includes several control functions including, but not limited to the following:

Setup functions. These generally relate to the required adjustments made on a part-to-part basis in the factory to allow for variations in component characteristics such as laser diode threshold current.

Identification. This refers to general purpose memory, typically EEPROM (electrically erasable and programmable read only memory) or other nonvolatile memory. The memory may be accessible using a serial communication standard, that is used to store various information identifying the transceiver type, capability, serial number, and compatibility with various standards. While not standard, this memory may also store additional information, such as sub-component revisions and factory test data.

Eye safety and general fault detection. These functions are used to identify abnormal and potentially unsafe operating parameters and to report these to the host and/or perform laser shutdown, as appropriate.

Temperature compensation functions. For example, compensating for known temperature variations in key laser characteristics such as slope efficiency.

Monitoring functions. Monitoring various parameters related to the transceiver operating characteristics and environment. Examples of parameters that may be monitored include laser bias current, laser output power, receiver power levels, supply voltage and temperature. Ideally, these parameters are monitored and reported to, or made available to, a host device and thus to the user of the transceiver.

Power on time. The transceiver's control circuitry may keep track of the total number of hours the transceiver has been in the power on state, and report or make this time value available to a host device.

Margining. "Margining" is a mechanism that allows the end user to test the transceiver's performance at a known deviation from ideal operating conditions, generally by scaling the control signals used to drive the transceiver's active components.

Other digital signals. A host device may configure the transceiver so as to make it compatible with various requirements for the polarity and output types of digital inputs and outputs. For instance, digital inputs are used for transmitter disable and rate selection functions while outputs are used to indicate transmitter fault and loss of signal conditions. The configuration values determine the polarity of one or more of the binary input and output signals. In some transceivers, these configuration values can be used to specify the scale of one or more of the digital input or output values, for instance by specifying a scaling factor to be used in conjunction with the digital input or output value.

Referring again to FIG. 3, the controller 150 is accessed by the status control module 195 which is configured to manage the operation of the diagnostic assembly. Based on data received from the controller 150, the status control module 195 drives the color of the LED indicators, represented as 140A, 140B, and 140C, to represent changes in the value of the represented operational parameters.

In addition to controlling the visual color of LED indicators 140A, 140B and 140C, the status control module 195 also drives the modulation of the light signal emitted from the LEDs. The modulation of the light signal emitted from the LEDs results in an optical output signal representative of the transceiver diagnostic data. The LED indicators 140A, 140B and 140C can be modulated with the diagnostic data regardless of the color of the LED, and regardless of the operational parameter value the LED indicator is visually representing. The LED indicators 140A, 140B and 140C may be modulated individually or all at the same time.

Diagnostic data is sent from the controller 150 via a universal asynchronous receiver/transmitter (UART) 142 using standard non-return-to-zero (NRZ) serial data. The term "universal asynchronous receiver/transmitter" or "UART" refers to a piece of computer hardware that translates data between parallel and serial interfaces. Used for serial data telecommunication, a UART converts bytes of data to and from asynchronous start-stop bit streams represented as binary electrical impulses. Many microcontrollers have UART hardware which would otherwise not be used in existing fiber optic transceiver designs. The term "non-return-to-zero" or "NRZ" refers to code in which "1s" are represented by one significant condition and "0s" are represented by another, with no neutral or rest condition, such as a zero amplitude in amplitude modulation (AM), zero phase shift in phase-shift keying (PSK), or mid-frequency in frequency-shift keying (FSK).

Utilizing this type of communication link, this exemplary embodiment requires only one "wire" or "path" in each direction, i.e., one input, one output, two "paths," and is amenable to single wire communication as well. Transmission and reception of data may be either full duplex (sending and receiving simultaneously) or half-duplex (sending and receiving in turn but not simultaneously). However, exemplary embodiments of the invention should not be construed to be limited to the use of UARTs using NRZ serial data. Alternative communication formats that possibly may be used to communicate with the controller 150 include an inter-integrated chip ($I^2C$) bus or a serial peripheral interface (SPI) bus.

Diagnostic data being transmitted from the controller 150 is carried in this format to LED indicators 140A, 140B, and 140C for conversion from an electrical signal to an optical signal. The optical signal from the LED indicators is output to the external device and represents the diagnostic data of the transceiver. The light emitted from the LED indicators is humanly visible and represents the value of an operational parameter of the transceiver.

The modulation of the LED indicators 140A, 140B and 140C does not significantly affect the visibility of the indicators. The average duty cycle of the indicators is kept reasonably constant and the human eye may detect little flickering at worst, and even considerable flickering would be of no consequence to the validity and usefulness of the LED indicators themselves.

The emitted optical signal is received by the external device. In one embodiment, the external device accesses the optical signal via an optical connection assembly. The optical connection assembly may be a cable having a USB connector on one end for use with the external user device, a laptop in this example, and a second end which forms a clip that fits over the face of the transceiver. The clip end of the optical connection assembly that attaches to the face of transceiver contains optical subassemblies positioned to interface with the optical ports on the face of the transceiver. Thereby allowing data to be transferred between the optical indicator on the face of the transceiver and the external device. Embodiments of the clip are described in more detail in co-pending application Ser. No. 12/184,042, entitled "Optical Transceiver with LED Link Information Indicator", and filed on Jul. 31, 2008, which application is hereby incorporated by reference.

Figure 6A:
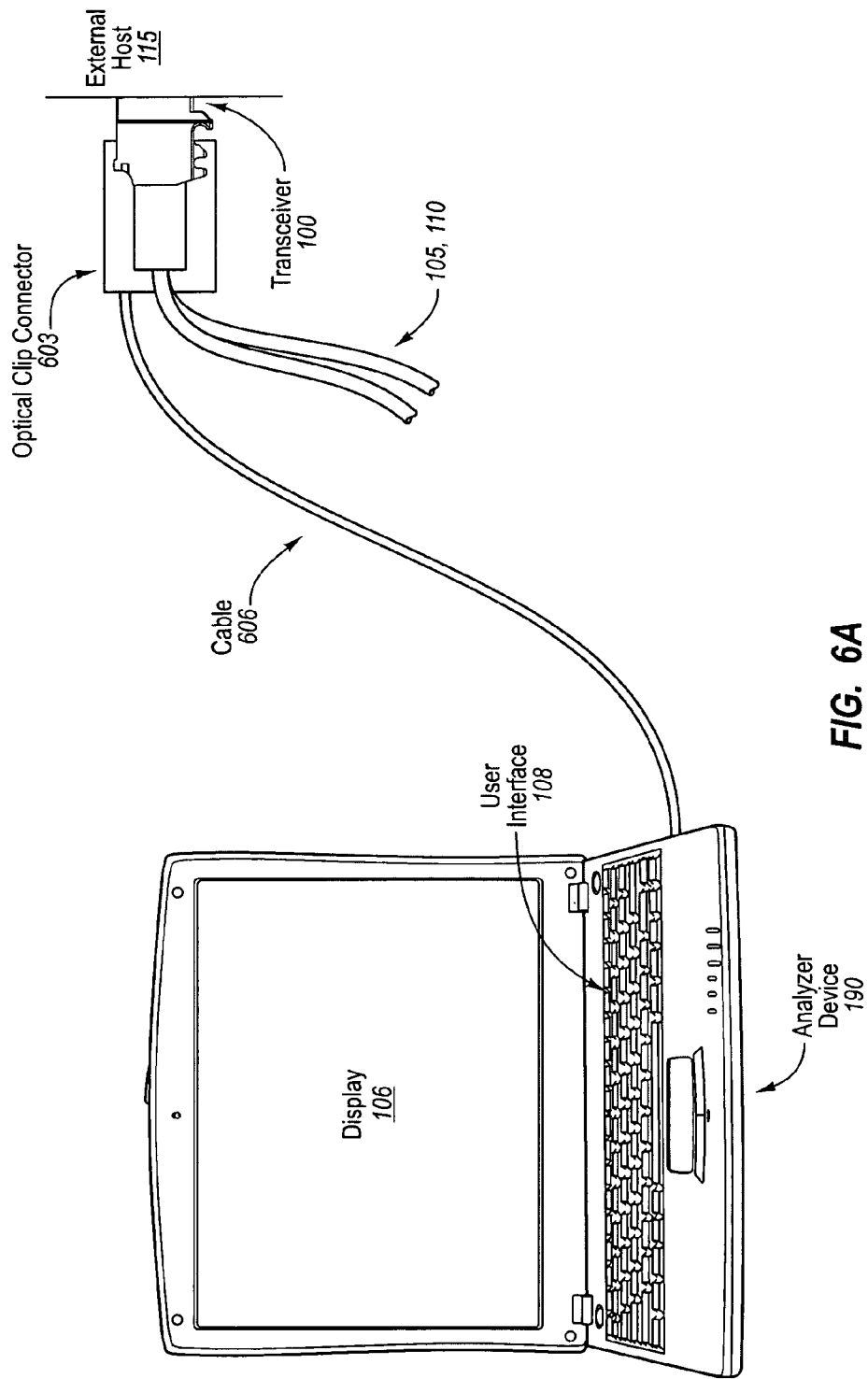
FIG. 6A illustrates an example embodiment of an optical clip connector that may implement features of the present invention.
Figure 6B:
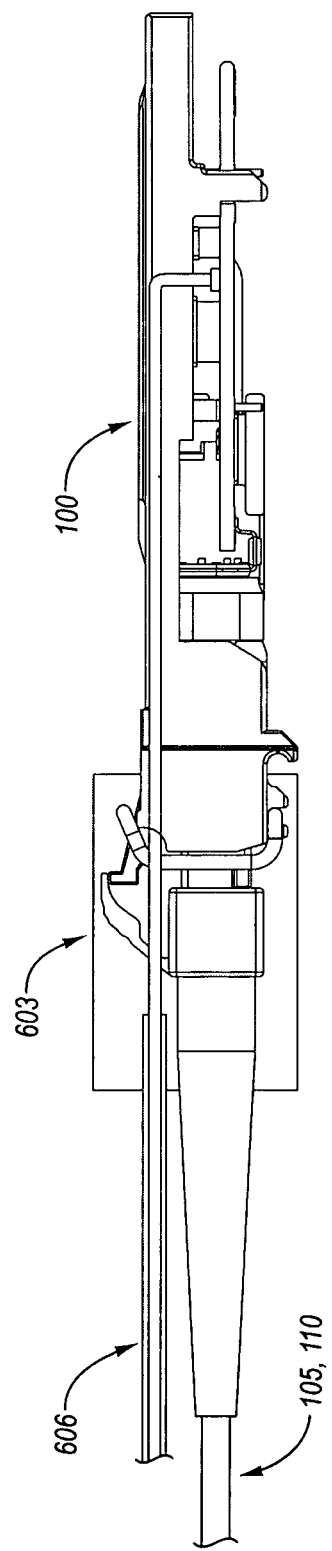
FIG. 6B illustrates the side view of an example optical clip connector that may implement features of the present invention.
Figure 6C:
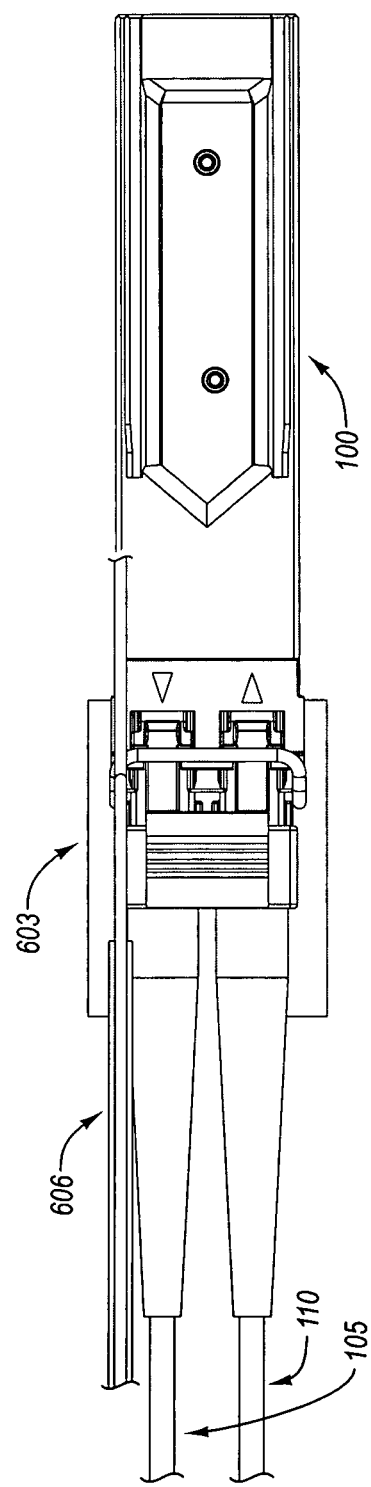
FIG. 6C illustrates the top view of an example optical clip connector that may implement features of the present invention.
Figure 6D:
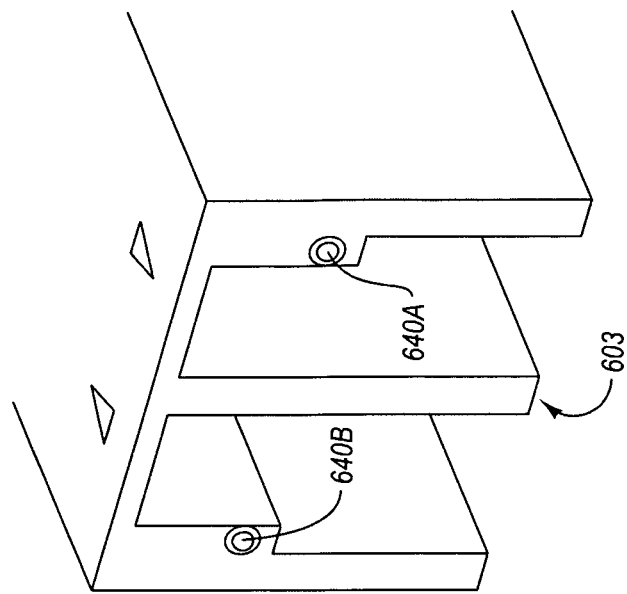
FIG. 6D illustrates an example of an optical transceiver and corresponding optical clip connector that may implement features of the present invention.
Figure 6D:
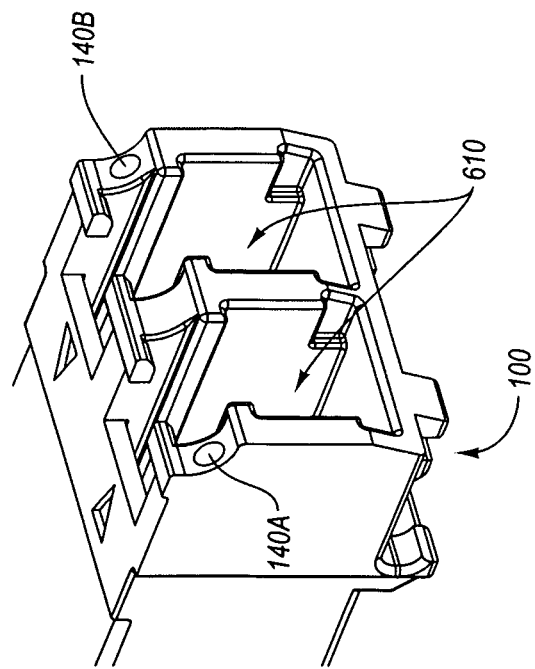
Figure 6E:
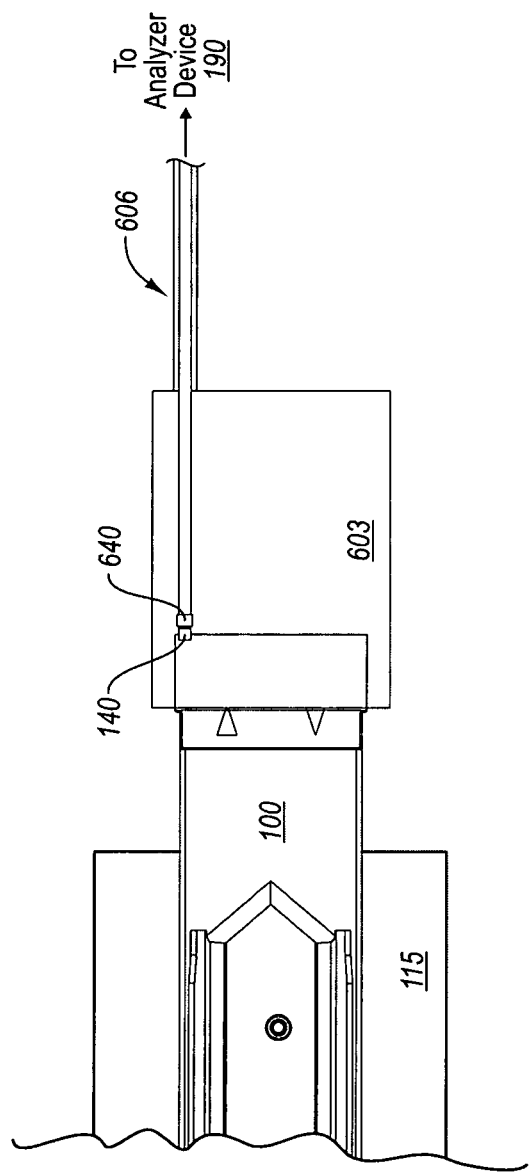
FIG. 6E illustrates the top view of an example optical transceiver and corresponding optical clip connector that may implement features of the present invention

FIGS. 6A-6E illustrate an exemplary embodiment of an optical clip connector. The analyzer device 190 communicates to the diagnostic assembly 140 of the transceiver 100 via the cable 606 and attached clip connector 603. The clip connector 603 fits over the face of the transceiver 100 and engages the diagnostic assembly 140 of the transceiver 100 without disruption of the transfer of data over fibers 105 and 110. As best shown in FIG. 6D, the face of the clip connector 603 contains optical ports 640A and 640B that correspond to diagnostic assembly LED indicators 140A and 140B, respectively, on the face of the transceiver 100. When attached to the face of the transceiver 100, the optical ports 640A and 640B of the clip connector 603 align with the diagnostic assembly LED indicators 140A and 140B of the transceiver 100 such that optical signals may be properly transferred from the LEDs to the clip connector.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A transceiver module comprising:
a housing having an aperture;
a printed circuit board at least partially enclosed in the housing;
a transmitter optical subassembly communicatively coupled to the printed circuit board for transmitting high-speed data over optical fiber;
a receiver optical subassembly communicatively coupled to the printed circuit board for receiving high-speed data over optical fiber;
a diagnostic assembly communicatively coupled to the printed circuit board, the diagnostic assembly comprising at least one light-emitting diode, each light-emitting diode configured to simultaneously emit both a visible first diagnostic output capable of being understood by the human eye and a modulated optical second diagnostic output capable of being understood by a computer, the first diagnostic output containing different diagnostic data than the second diagnostic output, each visual first diagnostic output representing an operational status of either the transmitter optical subassembly or of the receiver optical subassembly.

2. The transceiver module of claim 1, wherein each light-emitting diode is configured to emit the visible first diagnostic output in one of a plurality of colors each representing a different operational parameter value, at least one of the plurality of colors representing an intermediate operational status in which the transmitter optical subassembly or the receiver optical subassembly is operating but the operation is degraded or marginal.

3. The transceiver module of claim 1, wherein the modulated optical second diagnostic output is configured to be transmitted to the computer via a connection cable having a first end with a connector configured to communicatively couple to the computer and a second end having a clip configured to mechanically engage with the housing and optically align with the at least one light-emitting diode.

4. The transceiver module of claim 1, wherein the diagnostic assembly further comprises a light pipe assembly for conducting light emitted from the at least one light-emitting diode to the aperture in the housing such that the light emitted from the at least one light-emitting diode is visible to the human eye from outside the housing.

5. The transceiver module of claim 1, wherein the modulated optical second diagnostic output is capable of optically representing at least one of setup functions, identification information, eye safety and general fault detection information, temperature compensation functions, monitoring functions, power on time data, and margining data.

6. The transceiver module of claim 1, wherein the visible first diagnostic output of the diagnostic assembly is capable of visually representing three operational parameters.

7. The transceiver module of claim 6, wherein the visible first diagnostic output of the diagnostic assembly is capable of visually representing TxDisable, TxFault, and RxLOS.

8. The transceiver module of claim 1, wherein the visible first diagnostic output of the diagnostic assembly is capable of visually representing two operational parameters.

9. The transceiver module of claim 8, wherein the visible first diagnostic output of the diagnostic assembly is capable of visually representing TxDisable/TxFault and RxLOS.

10. A transceiver module comprising:
a housing having a diagnostic window;

a printed circuit board at least partially enclosed in the housing;

a transmitter optical subassembly communicatively coupled to the printed circuit board for transmitting high-speed data over optical fiber;

a receiver optical subassembly communicatively coupled to the printed circuit board for receiving high-speed data over optical fiber;

a diagnostic assembly communicatively coupled to the printed circuit board, wherein the diagnostic assembly comprises at least one multi-colored light-emitting diode, each light-emitting diode configured to emit a plurality of colors, each light-emitting diode further configured to simultaneously output:

a modulated optical signal containing first diagnostic data and capable of being understood by a computer; and a visual signal containing second diagnostic data and capable of being understood by the human eye, the first diagnostic data being different than the second diagnostic data, the second diagnostic data of the visual signal representing an operational status of either the transmitter optical subassembly or of the receiver optical subassembly.

11. The transceiver module of claim 10, wherein the first diagnostic data contained in the modulated optical output signal comprises at least one of setup functions, identification information, eye safety and general fault detection information, temperature compensation functions, monitoring functions, power on time data, and margining data.

12. The transceiver module of claim 10, where each of the plurality of colors of the visual signal represents a value of an operational status of a transceiver component, at least one of the plurality of colors representing an intermediate operational status in which the transmitter optical subassembly or the receiver optical subassembly is operating but the operation is degraded or marginal.

13. The transceiver module of claim 10, wherein the diagnostic assembly further comprises a means for conducting light emitted from each light-emitting diode to the diagnostic window such that the light emitted from each multicolored light-emitting diode is visible from outside the housing.

14. The transceiver module of claim 13, wherein the means for conducting light emitted from each light-emitting diode to the diagnostic window is a light-pipe assembly.

15. The transceiver module of claim 13, wherein the means for conducting light emitted from each light-emitting diode to the diagnostic window is an optical fiber having formed ends.

16. The transceiver module of claim 10, wherein the diagnostic window is visually ascertainable when optical cables are connected to the transceiver module.

17. The transceiver module of claim 10, wherein the modulated optical signal causes flickering in the visual signal that is detectable by the human eye.

18. The transceiver module of claim 1, wherein the modulated second diagnostic output causes flickering in the visual first diagnostic output that is detectable by the human eye.

19. The transceiver module of claim 1, wherein an average duty cycle of each light-emitting diode is kept substantially constant.

20. The transceiver module of claim 10, wherein an average duty cycle of each light-emitting diode is kept substantially constant.

21. The transceiver module of claim 1, wherein:

the transceiver module further comprises a controller communicatively coupled to the printed circuit board, the controller having a non-volatile memory, the controller configured to control the operation of the transmitter optical subassembly and the operation of the receiver optical subassembly, the controller further configured to store the diagnostic data of the first diagnostic output and of the second diagnostic output;

the diagnostic assembly further comprises a status control module communicatively coupled to the controller, the status control module configured to receive the diagnostic data of the first diagnostic output and of the second diagnostic output from the controller and, using the received diagnostic data of the first diagnostic output and of the second diagnostic output, drive the at least one light-emitting diode to produce the visible first diagnostic output and the modulated optical second diagnostic output.

22. The transceiver module of claim 10, wherein:

the transceiver module further comprises a controller communicatively coupled to the printed circuit board, the controller having a non-volatile memory, the controller configured to control the operation of the transmitter optical subassembly and the operation of the receiver optical subassembly, the controller further configured to store the first diagnostic data and the second diagnostic data;

the diagnostic assembly further comprises a status control module communicatively coupled to the controller, the status control module configured to receive the first diagnostic data and the second diagnostic data from the controller and, using the received first diagnostic data and the second diagnostic data, drive the at least one light-emitting diode to produce the modulated optical signal and the visual signal.

23. The transceiver module of claim 1, wherein the at least one light-emitting diode includes two or more light-emitting diodes that are each modulated individually with different portions of the diagnostic data of the second diagnostic output.

24. The transceiver module of claim 1, wherein the at least one multi-colored light-emitting diode includes two or more multi-colored light-emitting diodes that are each modulated individually with different portions of the first diagnostic data.

* * * * *